United States Patent
Seward, III et al.

[11] 3,954,485
[45] May 4, 1976

[54] SILVER-FREE POLARIZING PHOTOCHROMIC GLASSES

[75] Inventors: Thomas P. Seward, III; Paul A. Tick, both of Corning, N.Y.

[73] Assignee: Corning Glass Works, Corning, N.Y.

[22] Filed: Sept. 16, 1974

[21] Appl. No.: 506,523

[52] U.S. Cl.............. 106/47 Q; 106/DIG. 6; 106/54; 65/33
[51] Int. Cl.² ............................................ C03C 3/00
[58] Field of Search .......... 106/47 Q, 52, 54, 73.4, 106/73.5, DIG. 6; 350/160 P, 154; 65/33

[56] References Cited
UNITED STATES PATENTS

| | | |
|---|---|---|
| 2,319,816 | 5/1943 | Land ................................ 350/154 |
| 3,208,860 | 9/1965 | Armistead ........................... 106/54 |
| 3,325,299 | 6/1967 | Araujo ........................... 106/73.4 X |
| 3,328,182 | 6/1967 | Araujo ................................ 106/54 |
| 3,540,793 | 11/1970 | Araujo ........................... 106/52 X |

*Primary Examiner*—Winston A. Douglas
*Assistant Examiner*—John F. Niebling
*Attorney, Agent, or Firm*—Kees van der Sterre; Clinton S. Janes, Jr.; Clarence R. Patty, Jr.

[57] ABSTRACT

Silver-free photochromic glasses capable of reversibly changing from the clear nonpolarizing state to the darkened polarizing state are provided by heating a photochromic alkali boroaluminosilicate base glass containing copper and/or cadmium halides to a working temperature and elongating the glass to modify the photochromic particles therein.

9 Claims, 1 Drawing Figure

1000 Å

1000Å

SILVER-FREE POLARIZING PHOTOCHROMIC GLASSES

The present invention relates generally to the field of photochromic glasses and is particularly concerned with the preparation of photochromic glasses exhibiting light polarizing characteristics in the darkened state.

The basic disclosure relative to photochromic glasses is set forth in Armistead et al., U.S. Pat. No. 3,208,860. An illustration of such glasses are inorganic silicate glasses containing submicroscopic crystals of the silver halides, viz., silver chloride, silver bromide, and silver iodide, which become darker in color when the glass is subjected to actinic radiation, but which regain their original color when the actinic radiation is removed. This phenomenon is believed to be the result of a reaction occurring between the actinic radiation and the crystals dispersed in the glassy matrix, the absorptive qualities of the crystals to visible radiations being altered thereby. The removal of the actinic radiation allows the crystals to return to their original state because these crystals are surrounded by a glassy matrix which is inert and impermeable to the reaction products developed upon such exposure, and thus the reaction products cannot diffuse away from the site of the reaction. The capability of these glasses to reversibly vary the transmission of visible light has suggested their utility in windows, ophthalmic lenses, building siding materials, and the like.

The most common polarizer now in use, developed by E. H. Land, is a plastic material designated as "H-sheet." This polarizer, which appears neutral in color when viewed in unpolarized light, is made by absorbing iodine in a stretched sheet of polyvinyl alcohol. Once attached, the iodine tends to form long thin chains embedded in the transparent sheet of plastic material. The H-sheet remains "permanently" polarizing such that the material does not tend to change from the polarized to the unpolarized state and vice versa.

A very common use of plastic polarizing sheet is in the making of sunglasses which substantially reduce glare; however, these plastics have some disadvantages, such as low hardness and poor scratch resistance. Their low refractive index also prevents them from being used in the manufacture of prescription polarized sunglasses.

Photochromic glasses exhibiting light polarizing characteristics in the activated state are known. U.S. Pat. No. 3,540,793 to Araujo et al. discloses a photochromic polarizing glass capable of reversibly changing from the nonpolarizing to the polarizing state. This system is comprised of a silicate glass body having incorporated therein elongated particles of at least one silver halide, the glass being polarizing in the darkened state.

In order to render silver halide-containing photochromic glass polarizing it is necessary to elongate and orient silver halide particles of proper size in the glass matrix. The glass is subjected to a stretching step at elevated temperatures to permit the glass to be pulled without breakage, heating preferably to a uniform temperature of 500°–650°C. depending upon the properties of the base glass. During stretching the particles are elongated such that the length to width ratio of the silver halide particles is in the range of about 2:1–5:1. Stretching also produces orientation of the silver halide particles in the direction in which the glass is being pulled whereby the silver halide particles, in the form of fibrils, tend to be all aligned in one direction. In the darkened state the glass product will preferentially absorb light polarized in the direction of their alignment. Silver halide particles in an initial size range below 1000A may be successfully elongated and aligned in this manner, although as the particle size decreases, the ease of elongation of the particles becomes increasingly difficult.

The use of silver as the activating agent for imparting phototropicity to glass compositions has been found to be accompanied by several disadvantages. First, the sensitivity of silver-containing glasses to actinic radiation is too great for some applications, i.e., radiation of very low intensity causes substantial darkening of the glass. As an illustration of this phenomenon, sunlight falling upon such glasses in the fairly early morning, say about 8:00 a.m., will cause the glass to darken to substantially the same degree as sunlight received at high noon. It is quite obvious that a closer relationship between intensity of radiation and darkening of the glass would be beneficial in applications such as windowpanes, structural panels, eye glasses, and the like. Second, glasses containing silver often exhibit considerable temperature dependence, i.e., the amount of darkening changes with ambient temperature. In the usual case, the glass does not attain the same degree of darkening at high temperatures as it does at lower temperatures. Thus, changes in outdoor temperature directly affect the degree of darkening which a windowpane exhibits. Third, although having nothing to do with the chemical and physical properties of the glass, is the matter of the economics of using silver rather than a less expensive material. And finally, silver halide particles of a size sufficient to be elongated in glass typically produce haze due to the difference in refractive index between the particles and the glass matrix.

Silver-free photochromic glasses containing additions of copper, cadmium, and halogen are known. Thus, U.S. Pat. No. 3,325,299 to Araujo discloses glass compositions which can be made phototropic through the inclusion of copper and/or cadmium with at least one halogen selected from the group consisting of chlorine, bromine, and iodine. The preferred silicate base glass compositions are in the composition field

$R_2O.B_2O_3.Al_2O_3.SiO_2$ wherein $R_2O$ is an alkali metal oxide selected from the group consisting of $Li_2O$, $Na_2O$, $K_2O$, $Rb_2O$, and $Cs_2O$. In addition these base glasses contain a minimum of at least 0.3% by weight total of copper and/or cadmium and an amount of halogen capable of stoichiometric reaction with at least the minimum amount of metal, the sum of the aforementioned base glass constituents, halogens, copper and cadmium totaling at least about 85% by weight of the glass.

For the purposes of the present invention, glasses of the above type will be referred to as copper-cadmium photochromic glasses.

The darkening phase in copper-cadmium photochromic glasses is activated upon exposure to radiation of wavelengths between about 0.3–0.45 microns. The glasses therefore exhibit useful photochromic darkening characteristics in the presence of short wavelength visible light as well as ultraviolet radiation.

Electron micrograph studies of silver-free copper-cadmium photochromic glasses such as described in the aforementioned Araujo patent have indicated that the microstructure of the dispersed crystalline phase to which the darkening characteristics of the glass are attributed differs substantially from that of the silver halide photochromic glasses. Silver halide photochromic glasses typically contain dispersed second-phase crystals of a size in the range of 50–1000A which are deemed to be crystalline silver halide. Copper-cadmium photochromic glasses comprise second-phase crystalline droplets of a size comparable to the silver halide particles in silver-containing photochromic glasses, and in addition comprise third-phase particles of very small size (less than 50A) found in association with the second phase droplets.

The location of the color centers in darkened photochromic copper-cadmium glasses has not been positively determined. However, while it is possible that the color centers are located in the larger droplet phase, our present belief is that the larger phase probably consists of boron-rich droplets which separate from the base glass upon heat treatment, whereas the copper, cadmium, and halide photochromic agents are concentrated in the small third-phase particles which form within the base glass-droplet phase.

The microstructure of a photochromic glass of the copper-cadmium halide type is shown in the DRAWING, which is a transmission electron micrograph of a portion of such a glass wherein the bar indicates 1000A. The arrow designates a typical phase-separated droplet (light-colored region) wherein the third-phase particles are readily visible as small dark spots. These third-phase particles, being on the order of 50A or less in diameter, are not of a size which would permit elongation through known means such as heating and stretching the base glass.

SUMMARY OF THE INVENTION

Although the polarization mechanism is not fully understood, we have discovered that certain copper-cadmium halide photochromic glasses can be rendered polarizing in the darkened state through a heating and stretching process designed to elongate at least the large second-phase droplets present in the glass.

From the standpoint of composition, glasses which may be rendered polarizing in accordance with the present invention include the photochromic copper-cadmium glasses disclosed in the aforementioned patent to Araujo. Hence, suitable glasses may comprise 40–75% $SiO_2$, 4–26% $Al_2O_3$, 4–26% $B_2O_3$, 4–30% total of at least one alkali metal oxide selected in amounts not exceeding the indicated proportions from the group consisting of up to 8% $Li_2O$, up to 15% $Na_2O$, up to 20% $K_2O$, up to 25% $Rb_2O$ and up to 30% $Cs_2O$, 0.1–10% total of at least one metal oxide selected from the group consisting of CuO and CdO, and 0.1–6% total of halogens selected from the group consisting of Cl, Br, and I, the sum of these constituents totalling at least about 75% by weight of the glass.

Glasses within the above-described composition field may be melted at temperatures between 1350°–1550°C. in pots, tanks, or crucibles according to conventional glass melting practice and formed into glass articles by pressing, blowing, or other known methods. Conventional glass batch constituents may be employed in the melting process, with sufficient copper, cadmium, and halogen-containing constituents being added to compensate for volatilization losses and insure the presence of the specified quantities of these components in the formed glass articles.

Glasses within the above-described composition range can be rendered reversibly polarizing in accordance with the present invention provided that the second-phase droplets present therein after forming or subsequent heat treatment are in a size range of about 100–1000A. This degree of second phase development is accompanied by the development of third-phase particles such that the glass is photochromic, although not polarizing.

Whereas sufficient precipitation of second- and third-phase particles can occur during the forming of glass articles from the melt to impart photochromic properties thereto, rapid cooling of the melt will inhibit phase separation such that the glass product is only potentially photochromic. In that event, subsequent heat treatment is required to develop photochromic properties. This development can be obtained by a separate heat treatment wherein the glass article is heated to a temperature in the range of about 500°–900°C. for a time in the range of about 1/12–24 hours, in the manner conventional for copper-cadmium halide photochromic glasses. Such heat treatments produce photochromic glass articles wherein the average size of the separated second-phase droplets is in the desired range of about 100–1000A.

Glass articles which have been rendered photochromic by such heat treatments can thereafter be rendered polarizing in the darkened state by a redrawing procedure wherein the temperature of the glass is adjusted to obtain a glass viscosity in the range of about $10^7$–$10^9$ poises, (typically 500°–650°C.) and the glass article is then elongated to a length at which the previously developed second-phase droplets exhibit aspect ratios in the range of about 2:1 to about 5:1. The glass article may be cooled to room temperature for inspection prior to redrawing, if desired.

Alternatively, adequate second-phase development may be obtained in the course of the redrawing treatment utilizing the heat required to soften and elongate the glass. Thus, the development of photochromic and polarizing properties in a potentially photochromic glass can be simultaneously accomplished by heating the glass article to a temperature in the range where the glass viscosity is $10^7$–$10^9$ poises and maintaining the glass in that temperature range for a time sufficient to achieve the required second-phase development, while elongating the glass to a length where the developing second-phase particles achieve aspect ratios in the range of 2:1 to 5:1.

In either case, the glass is rapidly cooled below its annealing point following redrawing to prevent respheroidization of the elongated second-phase droplets.

The discovery that substantial polarization effects could be produced in copper-cadmium halide photochromic glasses was unexpected. It was known that large (100–1000A) silver halide particles could be elongated in glass to yield such effects; however, similarly large copper or cadmium halide particles had not been observed in the copper-cadmium halide photochromic system. Nor is it likely that elongation treatments such as we utilize effect any elongation of the extremely small (<50A) third-phase particles thought to be primarily responsible for photochromic absorption in these glasses, although the small size of the particles is such that their behavior during elongation cannot be confirmed. Nevertheless, darkened glasses wherein the second-phase particles have been elongated as described do exhibit preferential absorption of light polarized such that its electric vector is parallel to the direction of elongation of the second-phase particles.

The mechanism of polarization, while not fully understood, might be based on an unusual optically-coupled distribution of the third-phase particles. Certain dichroic effects of linear aggregations of small particles have been previously reported by R. C. Jones and G. R. Bird in *Photographic Science and Engineering*, Volume 16, No. 1, Jan.-Feb., 1972, pages 16-24. The elongated second-phase particles in our glasses may provide a surface upon which such anisotropic arrays of the third-phase particles could form. Thus, in addition to any polarizing electric field effects associated with the difference in refractive index between the second phase and the base glass, optical coupling between adjacent third-phase particles could itself produce polarization effects.

Advantageously, the large size of the second-phase particles does not produce haze such as is observed in some polarizing silver halide photochromic glasses because the refractive index of the second-phase material is near that of the base glass.

DETAILED DESCRIPTION

Examples of glass compositions which may be formed into glass articles exhibiting reversible polarizing and photochromic behavior in accordance with the invention are set forth in Table I below. Compositions are given in parts by weight on the oxide basis as calculated from the batch. Halogens are reported on an elemental basis in accordance with conventional practice.

neously imparted to the glass utilizing a single redrawing process as follows.

The bars are clamped in a redrawing furnace, heated to temperatures in the range of about 500°–650°C. corresponding to glass viscosities in the range of about $10^7$–$10^9$ poises, and stretched by tensile forces applied to the glass through bar end clamps actuated by chains and a hydraulic cylinder. A stretching rate of about 2 inches per minute is employed, with elongation of the heated bar sections by a factor of about 50 being attained over a time period of about 20–30 minutes. Thereafter, the redrawing furnace is opened and the bars are rapidly cooled to below annealing temperatures.

Substantial elongation of the glass is typically required to obtain the desired aspect ratios of at least about 2:1 and preferably up to 5:1 or more in the precipitated second-phase particles. Elongation by a factor of about 50–70 is suitable for achieving useful light polarizing properties in glass bars elongated according to the present invention.

Lower stretching speeds and/or higher stretching temperatures may be utilized if desired, but these generally reduce shear forces on the second phase particles and thus limit the aspect ratios which may be attained. It is therefore preferred to utilize the fastest possible stretching speeds at the lowest redrawing temperatures permitted by the strength of the glass within the viscosity limitations above set forth. Also, rapid cooling immediately following the redrawing treatment is desirable to minimize the respheroidization of second-phase droplets which occurs at elevated temperatures.

Following stretching and rapid cooling, glass samples having compositions such as set forth in Table I exhibit both good photochromic properties and substantial

TABLE I

| Sample No. | 1 | 2 | 3 | 4 | 5 | 6 | 7 | 8 | 9 |
|---|---|---|---|---|---|---|---|---|---|
| SiO$_2$ | 50.3 | 51.6 | 50.7 | 54.2 | 50.3 | 51.2 | 52.5 | 47.1 | 53.3 |
| B$_2$O$_3$ | 20.4 | 20.9 | 20.8 | 21.7 | 20.4 | 20.8 | 21.1 | 19.7 | 21.5 |
| Al$_2$O$_3$ | 8.0 | 8.2 | 8.1 | 8.9 | 8.0 | 8.1 | 8.3 | 10.3 | 8.8 |
| Na$_2$O | 8.3 | 8.6 | 8.5 | 8.9 | 8.3 | 8.5 | 8.7 | 8.0 | 8.0 |
| K$_2$O | — | — | — | — | — | — | — | — | — |
| Li$_2$O | 1.3 | 1.1 | 1.3 | — | 1.3 | 0.7 | 0.7 | 1.0 | — |
| CuO | 0.35 | 0.36 | 0.36 | 0.36 | 0.35 | 0.36 | 0.36 | 0.36 | 0.35 |
| CdO | 2.1 | 2.1 | 2.1 | 2.2 | 2.1 | 2.1 | 2.1 | 2.1 | 1.9 |
| Cl | 2.7 | 2.7 | 2.7 | 2.9 | 2.7 | 2.7 | 2.8 | 2.6 | 1.4 |
| Br | — | — | — | — | — | — | — | — | 1.1 |
| I | — | — | — | — | — | — | — | — | — |
| F | 1.3 | 1.3 | 1.3 | 1.3 | 1.3 | 1.3 | 1.3 | 1.2 | 1.3 |
| MgO | 2.7 | 4.5 | 2.7 | — | 2.7 | 4.5 | 2.8 | 4.3 | — |
| SnO$_2$ | 0.3 | 0.3 | 0.3 | — | 0.3 | 0.3 | 0.3 | 0.3 | 0.3 |
| Ta$_2$O$_5$ | 2.7 | — | 0.9 | — | 2.7 | — | — | — | — |
| ZrO$_2$ | — | — | — | — | — | — | — | 0.9 | — |
| TiO$_2$ | — | — | — | — | — | — | — | 2.1 | — |
| La$_2$O$_3$ | — | — | — | — | — | — | — | — | 1.2 |

Glass batches of the above compositions are compounded utilizing conventional glass batch constituents, and the batches are then ball-milled to assure a homogeneous melt. Glass articles are then formed of the above compositions by melting the batches in covered crucibles at 1475°C. for 6 hours, pouring the melts into molds to form glass bars which are about 15 inches long, 2 inches wide, and ¾ inch thick, and annealing the glass bars at 425°C. for 1 hour.

The annealed bars thus prepared are not photochromic as formed, but are potentially photochromic and can be rendered photochromic by short-duration heat treatments in the 500°–900°C. temperature range as above described. However, in the present instance, photochromic and polarizing properties are simultapolarizing capabilities. The photochromic darkening characteristics of the samples are determined by first measuring the visible light transmission of each glass, then exposing the glass to a xenon arc lamp for 10 minutes to obtain photochromic darkening of the glass, and finally measuring the darkened visible light transmission of the glass.

The polarizing capability of the fully-darkened glass samples is determined by directing polarized light through each sample, comparing the percent transmission of light polarized parallel to the direction of elongation of the second-phase particles with the percent transmission of light polarized perpendicular thereto. The polarizing capability of each sample is represented by its polarization efficiency which is defined as $$\text{Efficiency } (\%) = \frac{T_a - T_b}{T_a + T_b} \times 100$$

wherein $T_a$ is the percent transmission of polarized light with its electric vector parallel to the direction of elongation of the second-phase particles $T_b$ is the percent transmission of polarized light with its electric vector perpendicular to that direction.

Table II below sets forth data comparing the polarizing efficiencies and photochromic behavior of glass articles having compositions as set forth in Table I when redrawn according to the procedures hereinabove described. Table II includes the redrawing temperature at which the elongation of each glass was accomplished, in degrees Centigrade, the percent light transmission of the undarkened glass ($T_o$), the percent light transmission of the darkened glass after a 10 minute exposure to a xenon arc lamp ($T_D$), and the polarization efficiency of each darkened glass (E) expressed as a percent. All samples were elongated by a factor of about 50 at a rate of about 2 inches of sample length per minute. Sample numbers set forth in Table II correspond to those set forth in Table I.

TABLE II

| Sample No. | 1 | 2 | 3 | 4 | 5 | 6 | 7 | 8 | 9 |
|---|---|---|---|---|---|---|---|---|---|
| Redraw Temperature (°C.) | 575 | 572 | 574 | 574 | 569 | 578 | 555 | 609 | 609 |
| $T_o$ (%) | 78 | 53 | 91 | 56 | 80 | 84 | 68 | 76 | 74 |
| $T_D$ (%) | 22 | 20 | 42 | 26 | 26 | 35 | 31 | 30 | 22 |
| E (%) | 12 | 20 | 15 | 22 | 25 | 9 | 11 | 22 | 7 |

As can be seen from Table I above, a wide variety of additional conventional glass constituents may be incorporated into the glasses of the present invention as aids in melting the glass, to stabilize the glass, or for other known purposes. Examples of useful oxide additions include those selected, in amounts not exceeding the indicated proportions, from the group consisting of 0–15% $WO_3$, 0–15% MgO, 0–15% $Ta_2O_5$, 0–10% BaO, 0–10% PbO, 0–5% $La_2O_3$, 0–5% $TiO_2$ and 0–5% $P_2O_5$. Also included among the useful additives are fluorine, in amounts of about 0–4%, and one or more low-temperature reducing agents selected from the group consisting of SnO, FeO, $As_2O_3$ and $Sb_2O_3$ in amounts totalling 0–3% by weight. Glasses consisting essentially of these additives in combination with the previously described essential constituents constitute preferred glasses in accordance with the invention.

Presently, our most preferred photochromic polarizing glasses are those consisting essentially, in weight percent, of about 40–60% $SiO_2$, 5–15% $Al_2O_3$, 16–26% $B_2O_3$, 4–12% $Na_2O$, 0.1–0.5% CuO, 0.1–2.0% CdO, and 0.3–5% Cl.

We claim:

1. A method of making a photochromic glass article capable of reversibly changing from a clear, nonpolarizing state to a darkened, polarizing state which comprises the steps of:

a. providing a potentially photochromic glass article comprising, in weight percent, 40–75% $SiO_2$, 4–26% $Al_2O_3$, 4–26% $B_2O_3$, 4–30% total of at least one alkali metal oxide selected in amounts not exceeding the indicated proportions from the group consisting of up to 8% $Li_2O$, up to 15% $Na_2O$, up to 20% $K_2O$, up to 25% $Rb_2O$, and up to 30% $Cs_2O$, 0.1–10% total of at least one metal oxide selected from the group consisting of CuO and CdO, and 0.1–6% total of at least one halogen selected from the group consisting of Cl, Br, and I, the sum of these constituents totalling at least about 75% by weight of the glass;

b. heating the glass article to a temperature in the range of about 500°–900°C. for a time sufficient to cause the development therein of second-phase droplets having an average size in the range of about 100–1000A;

c. adjusting the temperature of the glass article to obtain a glass viscosity in the range of about $10^7$–$10^9$ poises;

d. elongating the glass article to a length at which the second phase droplets therein exhibit aspect ratios in the range of about 2:1 to about 5:1; and e. cooling the glass article to a temperature below the annealing point thereof.

2. A method in accordance with claim 1 wherein the potentially photochromic glass article has a composition consisting essentially, in weight percent, of about 40–75% $SiO_2$, 4–26% $Al_2O_3$ 4–26% $B_2O_3$, 4–30% total of at least one alkali metal oxide selected in amounts not exceeding the indicated proportions from the group consisting of up to 8% $Li_2O$, up to 15% $Na_2O$, up to 20% $K_2O$, up to 25% $Rb_2O$, and up to 30% $Cs_2O$, 0.1–10% total of at least one metal oxide selected from the group consisting of CuO, and CdO, 0.1–6% total of at least one halogen selected from the group consisting of Cl, Br, and I, the sum of these constituents totalling at least about 75% by weight of the glass, with the remainder of the glass being composed of optional constituents selected in amounts not exceeding the indicated proportions from the group consisting of 0–4% F, 0–15% $WO_3$, 0–15% MgO, 0–15% $Ta_2O_5$, 0–10% BaO, 0–10% PbO, 0–5% $La_2O_3$ 0–5% $TiO_2$, 0–5% $P_2O_5$, and 0–3% total of low temperature reducing agents selected from the group consisting of SnO, FeO, $As_2O_3$ and $Sb_2O_3$.

3. A method in accordance with claim 2 wherein the potentially photochromic glass article has a composition consisting essentially, in weight percent, of about 40–60% $SiO_2$, 5–15% $Al_2O_3$, 16–26% $B_2O_3$, 4–12% $Na_2O$, 0.1–5.0% CuO, 0.1–2.0% CdO, and 0.3–5% Cl.

4. A method of making a photochromic glass article capable of reversibly changing from a clear nonpolarizing state to a darkened polarizing state which comprises the steps of:

a. providing a potentially photochromic glass article comprising, in weight percent, 40–75% $SiO_2$, 4–26% $Al_2O_3$, 4–26% $B_2O_3$, 4–30% total of at least one alkali metal oxide selected in amounts not exceeding the indicated proportions from the group consisting of up to 8% $Li_2O$, up to 15% $Na_2O$, up to 20% $K_2O$, up to 25% $Rb_2O$, and up to 30% $Cs_2O$, 0.1–10% total of at least one metal oxide selected from the group consisting of CuO and CdO, and 0.1–6% total of at least one halogen selected from the group consisting of Cl, Br, and I, the sum of these constituents totalling at least about 75% by weight of the glass;

b. heating the glass article to a temperature range in which the glass viscosity thereof is in the range of about $10^7-10^9$ poises and maintaining the glass article in that temperature range for a time sufficient to cause the development therein of second-phase droplets having an average size in the range of about 100-1000A; while simultaneously c. elongating the glass article to a length at which the second phase droplets developing therein exhibit aspect ratios in the range of about 2:1 to about 5:1; and d. cooling the glass article to a temperature below the annealing point thereof.

5. A method in accordance with claim 4 wherein the potentially photochromic glass article has a composition consisting essentially, in weight percent, of about 40-75% $SiO_2$, 4-26% $B_2O_3$, 4-30% total of at least one alkali metal oxide selected in amounts not exceeding the indicated proportions from the group consisting of up to 8% $Li_2O$, up to 15% $Na_2O$, up to 20% $K_2O$, up to 25% $Rb_2O$, and up to 30% $Cs_2O$, 0.1-10% total of at least one alkali metal oxide selected from the group consisting of CuO and CdO, 0.1-6% total of at least one halogen selected from the group consisting of Cl, Br, and I the sum of these constituents totalling at least about 75% by weight of the glass, with the remainder of the glass being composed of optional constituents selected in amounts not exceeding the indicated proportions from the group consisting of 0-4% F, 0-15% $WO_3$, 0-15% MgO, 0-15% $Ta_2O_5$, 0-10% BaO, 0-10% PbO, 0-5% $La_2O_3$ 0-5% $TiO_2$, 0-5% $P_2O_5$, and 0-3% total of low temperature reducing agents selected from the group consisting of SnO, FeO, $As_2O_3$ and $Sb_2O_3$.

6. A method in accordance with claim 5 wherein the potentially photochromic glass article as a composition consisting essentially, in weight percent, of about 40-60% $SiO_2$, 5-15% $Al_2O_3$, 16-26% $B_2O_3$, 4-12% $Na_2O$, 0.1-5.0% CuO, 0.1-2.0% CdO, and 0.3-5% Cl.

7. A photochromic polarizing glass article capable of reversibly changing from the clear nonpolarizing state to a darkened polarizing state which has a composition comprising, in weight percent, 40-75% $SiO_2$, 4-26% $Al_2O_3$, 4-26% $B_2O_3$, 4-30% total of at least one alkali metal oxide selected in amounts not exceeding the indicated proportions from the group consisting of up to 8% $Li_2O$, up to 15% $Na_2O$, up to 20% $K_2O$, up to 25% $Rb_2O$ and up to 30% $Cs_2O$, 0.1-10% total of at least one metal oxide selected from the group consisting of CuO and CdO, and 0.1-6% total of at least one halogen selected from the group consisting of Cl, Br, and I, the sum of these constituents totalling at least about 75% by weight of the glass.

8. A photochromic polarizing glass article in accordance with claim 7 having a composition consisting essentially, in weight percent, of about 40-75% $SiO_2$, 4-26% $B_2O_3$, 4-30% total of at least one alkali metal oxide selected in amounts not exceeding the indicated proportions from the group consisting of up to 8% $Li_2O$, up to 15% $Na_2O$, up to 20% $K_2O$, up to 25% $Rb_2O$, and up to 30% $Cs_2O$, 0.1-10% total of at least one alkali metal oxide selected from the group consisting of CuO and CdO, 0.1-6% total of at least one halogen selected from the group consisting of Cl, Br, and I, the sum of these constituents totalling at least about 75% by weight of the glass, with the remainder of the glass being composed of optional constituents selected in amounts not exceeding the indicated proportions from the group consisting of 0-4% F, 0-15% $WO_3$, 0-15% MgO, 0-15% $Ta_2O_5$, 0-10% BaO, 0-10% PbO, 0-5% $La_2O_3$, 0-5% $TiO_2$, 0-5% $P_2O_5$, and 0-3% total of low temperature reducing agents selected from the group consisting of SnO, FeO, $As_2O_3$ and $Sb_2O_3$.

9. A photochromic polarizing glass article in accordance with claim 8 having a composition consisting essentially, in weight percent, of about 40-60% $SiO_2$, 5-15% $Al_2O_3$, 16-26% $B_2O_3$, 4-12% $Na_2O$, 0.1-5.0% CuO, 0.1-2.0% CdO, and 0.3-5% Cl.

* * * * *